United States Patent [19]
Guth et al.

[11] Patent Number: 5,393,956
[45] Date of Patent: Feb. 28, 1995

[54] METHOD FOR BUTT WELDING AT LEAST TWO METAL SHEETS

[75] Inventors: Jérôme Guth; Nathalie Philbois, both of Dunkerque, France

[73] Assignee: Sollac, Puteaux, France

[21] Appl. No.: 98,932

[22] Filed: Jul. 29, 1993

[30] Foreign Application Priority Data

Aug. 4, 1992 [FR] France .................. 92 09671

[51] Int. Cl.$^6$ ............................. B23K 26/00
[52] U.S. Cl. ................................ 219/121.64
[58] Field of Search ............. 219/121.63, 121.64

[56] References Cited

U.S. PATENT DOCUMENTS 5,250,783  10/1993  Nishi et al. .............. 219/121.64

FOREIGN PATENT DOCUMENTS

| 0279866 | 8/1988 | European Pat. Off. . |
| 0531139 | 3/1993 | European Pat. Off. . |
| 62-144888 | 6/1987 | Japan . |
| 57467 | 3/1993 | Japan . |

*Primary Examiner*—C. L. Albritton
*Attorney, Agent, or Firm*—Oblon, Spivak, McClelland, Maier & Neustadt

[57] ABSTRACT

The subject of the invention is a method for butt welding at least two metal sheets of different thicknesses, by means of a laser beam. The method consists in bringing the metal sheets into contact at their lateral faces to be butt jointed, in directing the laser beam towards the thicker metal sheet so that the vertical axis X—X passing through the focal point P of the laser beam on the said metal sheet is at a defined distance from the joint plane of the metal sheets and in making a welded joint at the butt jointed lateral faces by local melting of the said metal sheets by means of a laser beam.

8 Claims, 2 Drawing Sheets

METHOD FOR BUTT WELDING AT LEAST TWO METAL SHEETS

The subject of the present invention is a method for butt welding metal sheets of different thicknesses by means of a laser beam, more particularly so-called thin metal sheets with thickness less than 3 mm.

Laser welding has found an important industrial application in particular in the production of butt jointed blanks, for example in the motor industry.

Butt welding of metal sheets by means of a laser beam is carried out without a filler metal, and demands very high precision, shape and position requirements of the metal sheets to be welded.

For this purpose, the metal sheets must preferably have been cut with shears or a laser beam with a precision such that the clearance between the said metal sheets is a minimum, in order to ensure good quality of the contact between the metal sheets at the joint plane.

If the quality of the contact at the joint plane between the metal sheets to be welded is incorrect, that is to say if the clearance between the metal sheets to be welded is too great, the welded joint may not be continuous, and may have holes.

Moreover, if the clearance between the metal sheets at the joint plane is locally too great, the welded joint may exhibit thinning.

Such thinning of the joint plane is tolerated if it does not exceed certain limits.

Hence, the standards defined by the motor vehicle manufacturers require that for metal sheets whose thickness is less than 1 mm, the total value of thinning of the joint to be welded, that is to say the sum of the value of the thinning at the upper and lower part of the metal sheets, does not exceed 20% of the thickness of the thinner metal sheet.

Similarly, for metal sheets of thickness greater than 1 mm, the total value of the thinning of the welded joint must not exceed 10% of the thickness of the thinner metal sheet.

In order to limit these risks of a discontinuous joint or of excessive thinning, the quality of the cutting up of the metal sheets has hitherto been improved so as to limit undulations in the cutting edges and to provide a better contact of the metal sheets with each other in order better to control the clearance between the said metal sheets.

However, in order to obtain such a result, it is necessary to invest in very precise shears, at high cost, or to use double shears allowing both metal sheets to be butt jointed to be cut simultaneously, with the same blade.

In order to circumvent this expensive and difficult precision cutting operation, it is known to carry out the welding with a consumable filler wire which unwinds at the welding point.

This additional molten metal makes it possible to fill in the clearances present between the metal sheets.

It is also known to shape in advance the lateral faces of the metal sheets intended to be butt jointed, for example by hammering before welding.

This operation makes it possible to obtain vertical bulging of metal on the edges of the lateral faces in order to supply additional material at the clearances during the welding.

In both cases, the problems linked with the presence of clearances between the metal sheets are solved, but the welds produced often have raised lines at the upper face and also at the lower face.

These raised lines damage the punch and die during subsequent stamping of the welded piece, and this is increasingly significant as the thermally affected zone has, especially at the surface, a hardness at least twice as great as the hardness of the basic metal.

In addition, these known methods are difficult to transpose to welding of metal sheets of different thicknesses.

The object of the present invention is to provide a method for butt welding of metal sheets of different thicknesses by means of a laser beam, making it possible to overcome the drawbacks mentioned hereinabove.

The subject of the present invention is a method for butt welding of at least two metal sheets of different thickness, by means of a laser beam, characterised in that:

the metal sheets are brought into contact at their lateral faces to be butt jointed together, the laser beam is directed towards the thicker metal sheet so that the vertical axis passing through the focal point of the laser beam on the said metal sheet is at a defined distance from the joint plane of the metal sheet, and a welded joint is made at the butt jointed lateral faces by local melting of the said metal sheets by means of the laser beam.

According to other characteristics of the invention:

the distance of the vertical axis passing through the focal point of the laser beam, with respect to the joint plane of the metal sheets, lies between 0.2 and 0.3 times the difference in height between the main faces of the said metal sheets, at the joint plane on the laser beam side, the focal point of the laser beam is situated approximately at a third of the thickness of the thickest metal sheet below the face of the said metal sheet onto which the laser beam is directed, the axis of the laser beam is perpendicular to the face of the thickest metal sheet onto which the laser beam is directed, the laser beam is inclined with respect to the vertical by a given angle and pointed towards the thickest metal sheet, the axis of the laser beam forms, with the vertical axis passing through the focal point of the said laser beam, an angle, expressed in degrees, lying between $6(\Delta e - 0.2)$ and $6\Delta e + 3$, $\Delta e$ being the difference in thickness between the two metal sheets expressed in millimeters, the axis of the laser beam forms, with the vertical axis passing through the focal point of the said laser beam, an angle lying between 2° and 15°.

The characteristics and advantages of the invention will emerge during the description which is to follow, given solely by way of example, and made with reference to the attached drawings, in which.

Figure 1:
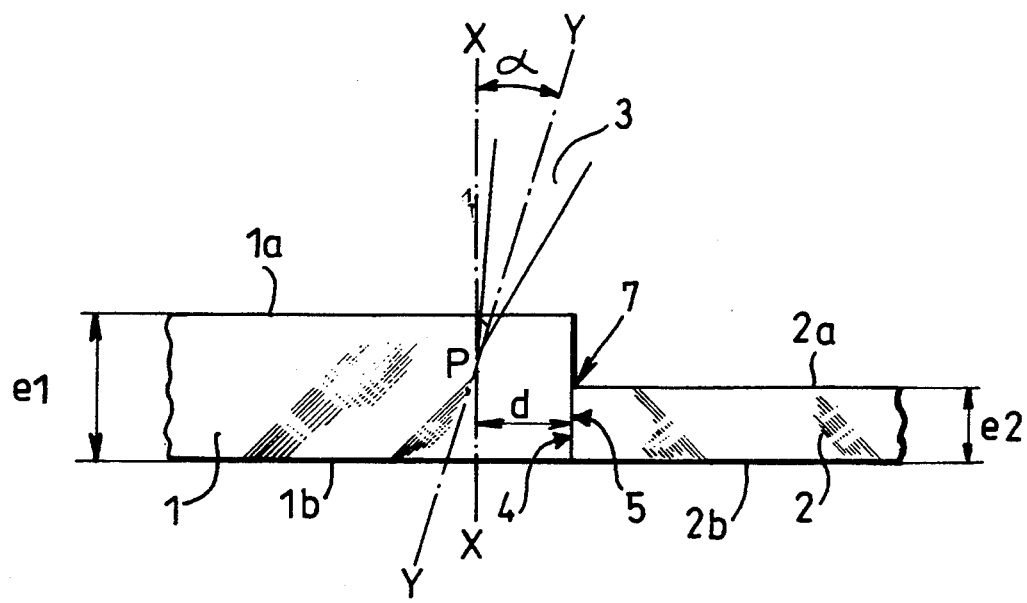
FIG. 1 is a diagrammatic view in elevation of two metal sheets of different thicknesses, during welding by the method according to the present invention, in the case when two main faces of these metal sheets are situated in the same plane.

The method according to the present invention consists in butt welding two metal sheets of different thicknesses, by means of a laser beam 3, a metal sheet 1 of thickness $e_1$ and a metal sheet 2 of thickness $e_2$, less than $e_1$.

The method according to the present invention consists:
in bringing the metal sheets 1 and 2 into contact at their lateral faces 4 and 5 to be butt jointed, that is to say at their edges 4 and 5 to be butt jointed,
in directing the laser beam 3 towards the upper face 1a of the thickest metal sheet 1, so that the vertical axis X—X perpendicular to the upper face 1a of the said metal sheet 1, and passing through the focal point P of the laser beam 3, is at a given distance d from the joint 7 of the said metal sheets 1 and 2,
and in making a welded joint at the joint plane 7 by local melting of the metal sheets 1 and 2 by means of the laser beam 3, either by moving the said laser beam with respect to the said metal sheets, or by moving these metal sheets below the laser beam 3.

Figure 2:
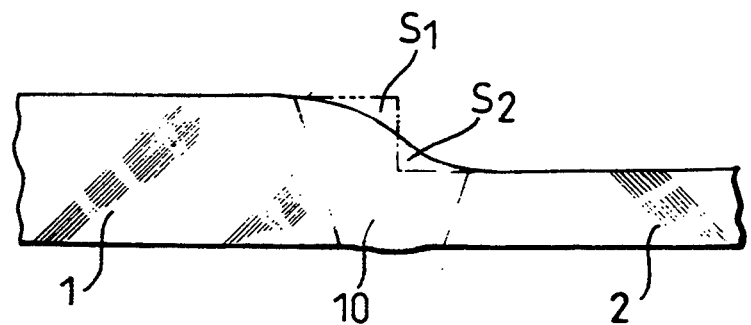
FIG. 2 is a diagrammatic view in cross section of the two sheets, after welding by the method according to the present invention.

In FIGS. 1 and 2, the main face 1b of the metal sheet 1 opposite the main face 1a onto which the laser beam 3 is directed, is Situated in the same plane as one 2b of the main faces 2a and 2b of the metal sheet 2.

In this case, the distance d of the vertical axis X—X passing through the focal point P of the laser beam 3 with respect to the joint plane 7 of the metal sheets 1 and 2 lies between 0.2 and 0.3 times the difference in thickness ($e_1-e_2$) between the said metal sheets 1 and 2.

Figure 3:
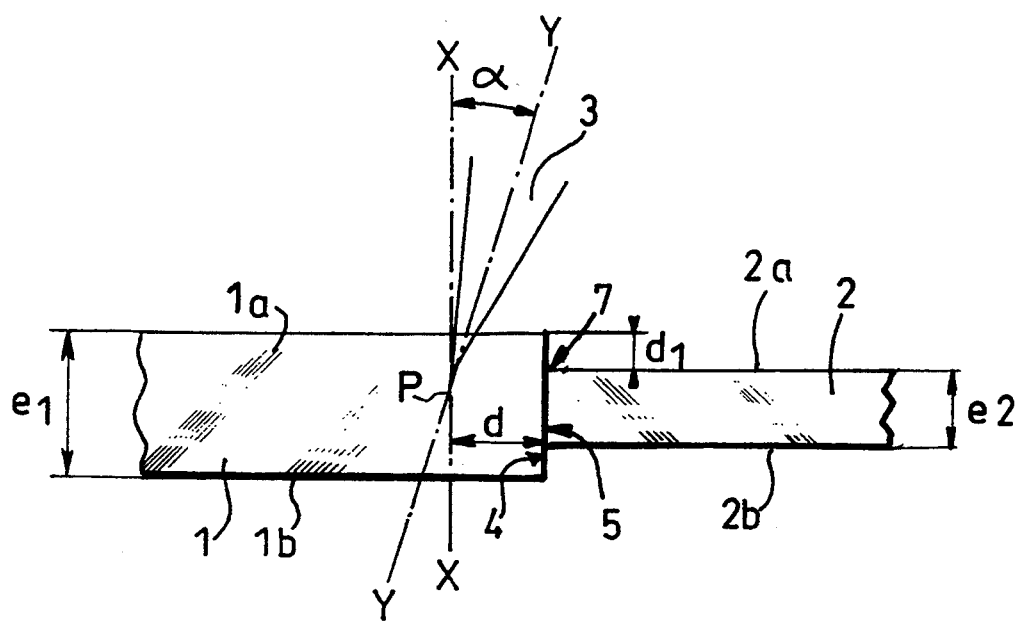
FIG. 3 is a diagrammatic view in elevation of two metal sheets of different thicknesses, during welding by the method according to the present invention, in the case when the main faces of the sheets are not situated in the same plane.

The metal sheets 1 and 2 may be offset with respect to each other as represented in FIG. 3.

In this case, the distance of the vertical axis X—X passing through the focal point P of the laser beam 3 with respect to the joint plane 7 of the metal sheets 1 and 2 lies between 0.2 and 0.3 times the difference in height $d_1$ between the main faces 1a and 2a of the metal sheets 1 and 2, at the joint plane 7 on the laser beam 3 side.

In order to make a correct welded joint, the focal plane P of the laser beam 3 is situated approximately at one third of the thickness $e_1$ of the thickest metal sheet 1 below the face 1a of the said metal sheet onto which the laser beam 3 is directed.

As represented in FIG. 2, by offsetting the laser beam 3 in the thickest metal sheet 1 with respect to the joint plane 7, the metal situated in the surface $S_1$ of the metal sheet 1 is melted and flows so as to form the surface $S_2$ on the metal sheet 2.

The surface $S_2$ corresponds to the metal which has flowed from the surface $S_1$ into the possible spaces present at the joint plane and on the surface of the metal sheet 2.

Thus, a welded zone 10 is obtained which has almost perfect continuity between the two thicknesses $e_1$ and $e_2$ of the metal sheets 1 and 2 when the distance d lies between 0.2 and 0.3 times the difference in thickness between the said metal sheets 1 and 2 or the difference in height between the main faces of the metal sheets 1 and 2 on the laser beam 3 side.

In this case, the optimal joining situation is obtained, the line of the join being tangential to the surfaces of the metal sheets 1 and 2.

During welding, the axis Y—Y of the laser beam 3 may be perpendicular to the main face 1a of the thickest metal sheet 1 onto which it is directed, which is most often the case for welding metal sheets of different thicknesses.

However, particularly in the case of welding metal sheets 1 and 2 whose difference in thickness ($e_1-e_2$) is greater than 1 mm, the shape of the welded joint between the two metal sheets 1 and 2 is substantially improved by inclining the laser beam 3 with respect to the vertical by a given angle $\alpha$, directed towards the thicker metal sheet 1. In this case, the axis Y—Y of the laser beam forms with respect to the vertical axis X—X passing through the focal point P of the said laser beam 3, an angle $\alpha$ lying between 2° and 15°.

Preferably, the axis Y—Y is inclined with respect to the axis X—X by an angle $\alpha$, expressed in degrees, lying between 6 ($\Delta e-0.2$) and 6 $\Delta e+3$, $\Delta e$ being the difference between the two metal sheets 1 and 2 expressed in millimeters.

This condition of inclination of the axis Y—Y of the laser beam 3 is important for obtaining a perfect joining profile of the welded joint.

In fact, if the axis Y—Y of the laser beam 3 is inclined by an angle $\alpha$ greater than 6 $\Delta e+3$, the welded joint has porosities which are unacceptable, because they impair its mechanical strength.

The method according to the present invention makes it possible to butt weld at least two metal sheets of different thicknesses, while optimizing the joining profile of the welded joint, that is to say while producing a welded joint which has neither raised lines nor hollows.

The welded joints thus obtained have a good mechanical strength, essentially fatigue strength and tensile strength, because the discontinuities are eliminated.

In fact, the join line between the two metal sheets has perfect continuity, the said line being tangential to the surfaces of the metal sheets, and therefore does not have sharp points, or fracture starting points.

In addition, the surface condition obtained is quite compatible with a subsequent stamping operation.

In the description and the claims, the vertical axis X—X passing through the focal point of the laser beam has been defined assuming that the metal sheets are arranged horizontally.

In general, this axis X—X is perpendicular to the main face of the metal sheet onto which the laser beam is directed.

We claim:
1. A method for butt welding first and second metal sheets together at the lateral faces thereof, said first metal sheet having a thickness greater than that of said second metal sheet, comprising the steps of:
moving said first and second metal sheets into contact with each other at said lateral faces thereof;
irradiating a laser beam at said first metal sheet such that the axis of said laser beam intersects an axis parallel to said lateral faces and which passes through the focal point of said laser beam, the point of intersection being within said first metal sheet at a given distance from a joint plane formed by said contact of said lateral faces and below the surface of the first metal sheet upon which the laser beam is incident at a distance approximately one-third the thickness of the first metal sheet; and
locally melting said first and second metal sheets using said laser beam so as to form a welded joint at said joint plane between said first and second metal sheets.

2. A method for butt welding first and second metal sheets together at the lateral faces of said first and second metal sheets, said first metal sheet having a thickness greater than that of said second metal sheet, comprising the steps of:

moving said first and second metal sheets into contact with each other at said lateral faces thereof;

irradiating a laser beam at said first metal sheet such that the axis of said laser beam is inclined at a given angle with respect to an axis which is parallel to said lateral faces and which passes through the focal point of said laser beam; and locally melting said first and second metal sheets using said laser beam so as to form a welded joint at a joint plane between said first and second metal sheets.

3. The method according to claim 2, wherein said step of irradiating said laser beam comprises:

projecting said laser beam at said first metal sheet such that said given angle, expressed in degrees, is between $6(\Delta e - 0.2)$ and $6\Delta e + 3$, wherein $\Delta e$ is the difference in thickness between the two sheets, expressed in millimeters.

4. The method according to claim 3, wherein said step of irradiating said laser beam comprises:

projecting said laser beam at said first metal sheet such that said given angle is between 2° and 15°.

5. A method for butt welding first and second metal sheets together at the lateral faces thereof, said first metal sheet having a thickness greater than that of said second metal sheet, comprising the steps of:

moving said first and second metal sheets into contact with each other at said lateral faces thereof;

irradiating a laser beam at said first metal sheet such that the axis of said laser beam is at a given angle with respect to an axis which is parallel to said lateral faces and which passes through the focal point of said laser beam, said focal point being within said first metal sheet at a given distance from a joint plane formed by said contact of said lateral faces; and locally melting said first and second metal sheets using said laser beam so as to form a welded joint at said joint plane between said first and second metal sheets.

6. The method according to claim 5, wherein said step of irradiating said laser beam comprises:

projecting said laser beam at said first metal sheet from a given distance such that said focal point of said laser beam exists within said first metal sheet at a point below the surface of the first metal sheet upon which the laser beam is incident approximately one-third the thickness of the first metal sheet.

7. The method according to claim 5, wherein said step of irradiating said laser beam comprises:

projecting said laser beam at said first metal sheet such that said given angle, expressed in degrees, is between $6(\Delta e - 0.2)$ and $6\Delta e + 3$, wherein $\Delta e$ is the difference in thickness between the two sheets, expressed in millimeters.

8. The method according to claim 7, wherein said step of irradiating said laser beam comprises:

projecting said laser beam at said first metal sheet such that said given angle is between 2° and 15°.

* * * * *